US 11,373,090 B2

(12) United States Patent
Agarwal et al.

(10) Patent No.: US 11,373,090 B2
(45) Date of Patent: Jun. 28, 2022

(54) TECHNIQUES FOR CORRECTING LINGUISTIC TRAINING BIAS IN TRAINING DATA

(71) Applicant: Tata Consultancy Services Limited, Mumbai (IN)

(72) Inventors: Puneet Agarwal, Noida (IN); Mayur Patidar, Noida (IN); Lovekesh Vig, Gurgaon (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 954 days.

(21) Appl. No.: 16/134,360

(22) Filed: Sep. 18, 2018

(65) Prior Publication Data

US 2019/0087728 A1   Mar. 21, 2019

(30) Foreign Application Priority Data

Sep. 18, 2017   (IN)   ............................. 201721033035

(51) Int. Cl.
*G06N 3/08*   (2006.01)
*G06N 5/04*   (2006.01)
(Continued)

(52) U.S. Cl.
CPC ........... *G06N 3/08* (2013.01); *G06F 16/2455* (2019.01); *G06N 3/0445* (2013.01);
(Continued)

(58) Field of Classification Search
CPC ...... G06N 3/08; G06N 3/0445; G06N 3/0454; G06N 3/0472; G06N 5/046; G06F 16/2455
See application file for complete search history.

(56) References Cited

U.S. PATENT DOCUMENTS 9,715,496 B1 *   7/2017   Sapoznik ................. G06N 3/04
2014/0214401 A1   7/2014   Li et al.
2020/0137001 A1 *  4/2020   Wu ....................... G06F 40/216

FOREIGN PATENT DOCUMENTS

WO   WO-2017/090051   6/2017

OTHER PUBLICATIONS

Murdoch et al "Automatic Rule Extraction From Long Short Term Memory Networks", ICLR Feb. 24, 2017 (Year: 2017).*

(Continued)

*Primary Examiner* — Michael J Huntley
*Assistant Examiner* — Imad Kassim
(74) *Attorney, Agent, or Firm* — Finnegan, Henderson, Farabow, Garrett & Dunner, LLP

(57) ABSTRACT

In automated assistant systems, a deep-learning model in form of a long short-term memory (LSTM) classifier is used for mapping questions to classes, with each class having a manually curated answer. A team of experts manually create the training data used to train this classifier. Relying on human curation often results in such linguistic training biases creeping into training data, since every individual has a specific style of writing natural language and uses some words in specific context only. Deep models end up learning these biases, instead of the core concept words of the target classes. In order to correct these biases, meaningful sentences are automatically generated using a generative model, and then used for training a classification model. For example, a variational autoencoder (VAE) is used as the generative model for generating novel sentences and a language model (LM) is utilized for selecting sentences based on likelihood.

15 Claims, 6 Drawing Sheets

(51) Int. Cl.
*G06F 16/2455* (2019.01)
*G06N 3/04* (2006.01)

(52) U.S. Cl.
CPC ......... *G06N 3/0454* (2013.01); *G06N 3/0472* (2013.01); *G06N 5/046* (2013.01)

(56) References Cited

OTHER PUBLICATIONS

Chen et al. "ABC-CNN: An Attention Based Convolutional Neural Network for Visual Question Answering", Apr. 3, 2016 (Year: 2016).*

Bowman, S.R. et al. "Generating Sentences from a Continuous Space," *Proceedings of the 20th SIGNLL Conference on Computational Natural Language Learning,* Aug. 7-12, 2016, Berlin, Germany; pp. 10-21.

Jain, U. et al. "Creativity: Generating Diverse Questions using Variational Autoencoders," *2017 IEEE Conference on Computer Vision and Pattern Recognition (CVPR),* Jul. 21-26, 2017, Honolulu, Hawaii; pp. 6485-6494.

* cited by examiner

TECHNIQUES FOR CORRECTING LINGUISTIC TRAINING BIAS IN TRAINING DATA

PRIORITY CLAIM

This U.S. patent application claims priority under 35 U.S.C. § 119 to: Indian Patent Application No. 201721033035, filed on 18 Sep. 2017. The entire contents of the aforementioned application are incorporated herein by reference.

TECHNICAL FIELD

The embodiments herein generally relate to training data, and, more particularly, to techniques for correcting linguistic training bias in training data.

BACKGROUND

In recent years, an automated assistant system has deployed in multinational organizations to answer employee frequently asked questions (FAQs). The system is based on a long short-term memory (LSTM) classifier that is trained on a corpus of questions and answers carefully prepared by a small team of domain experts. However, linguistic training bias creeps into manually created training data due to specific phrases being used, with little or no variation, which biases the deep-learning classifier towards incorrect features. For example, the question "when my sick leave gets credited?" may be classified into a category related to 'Adoption Leave' resulting in a completely irrelevant answer. This is happened mainly because the words surrounding 'sick leave' in the query occurred more often in the training data for 'Adoption Leave'. As a result, if such words occur in users' query, the model may ignore other important words (such as 'sick leave') and classifies the query into incorrect class, based on such words. Further, often the FAQs as envisaged by the trainers are in fact incomplete, and transferring linguistic variations across question-answer pairs can uncover new question classes for which answers are missing. Also, relying on human curation may result in such linguistic training biases creeping into the training data, since every individual has a specific style of writing natural language and uses some words in specific context only.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides methods and systems for correcting linguistic training bias in training data. In one aspect, a processor-implemented method includes steps of: receiving a query from a user; generating a set of queries associated with the received query using a long short-term memory variational autoencoder (LSTM-VAE) at an inference time, wherein the LSTM-VAE is trained using a weight-cost annealing technique; discarding one or more queries comprising consecutively repeating words from the set of generated queries to create a subset of the generated queries; selecting one or more queries from the subset of the generated queries based on likelihood via a language model trained on a first set of training data, wherein the one or more selected queries are consistent with predefined data; classifying the one or more selected queries as queries that exists in the first set of training data and as new queries using a first classifier model; augmenting the first set of training data with the new queries to obtain a second set of training data; and training a second classifier model using the second set of training data, thus correcting linguistic training bias in training data.

In another aspect, a system for correcting linguistic training bias in training data is provided. The system includes one or more memories; and one or more hardware processors, the one or more memories coupled to the one or more hardware processors wherein the one or more hardware processors are capable of executing programmed instructions stored in the one or more memories to: receive a query from a user; generate a set of queries associated with the received query using a long short-term memory variational autoencoder (LSTM-VAE) at an inference time, wherein the LSTM-VAE is trained using a weight-cost annealing technique; discard one or more queries comprising consecutively repeating words from the set of generated queries to create a subset of the generated queries; select one or more queries from the subset of the generated queries based on likelihood via a language model trained on a first set of training data, wherein the one or more selected queries are consistent with predefined data; classify the one or more selected queries as queries that exists in the first set of training data and new queries using a first classifier model; augment the first set of training data with the new queries to obtain a second set of training data; and train a second classifier model using the second set of training data, thus correcting linguistic training bias in training data.

In yet another aspect, a non-transitory computer-readable medium having embodied thereon a computer program for executing a method for correcting linguistic training bias in training data. The method includes steps of: receiving a query from a user; generating a set of queries associated with the received query using a long short-term memory variational autoencoder (LSTM-VAE) at an inference time, wherein the LSTM-VAE is trained using a weight-cost annealing technique; discarding one or more queries comprising consecutively repeating words from the set of generated queries to create a subset of the generated queries; selecting one or more queries from the subset of the generated queries based on likelihood via a language model trained on a first set of training data; classifying the one or more selected queries as queries that exists in the first set of training data and new queries using a first classifier model; augmenting the first set of training data with the new queries to obtain a second set of training data; and training a second classifier model using the second set of training data, thus correcting linguistic training bias in training data.

It should be appreciated by those skilled in the art that any block diagram herein represents conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The detailed description is described with reference to the accompanying figures. In the figures, the left-most digit(s) of a reference number identifies the figure in which the reference number first appears.

The same numbers are used throughout the drawings to reference like features and modules.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present subject matter herein provides a system and method for correcting linguistic training bias in training data, in accordance with an example embodiment. The present subject matter automatically generates meaningful sentences using a generative model, and then use them for training a classification model after suitable annotation. In the present subject matter, a variational autoencoder (VAE), trained using a weight cost annealing technique, is used as the generative model for generating novel sentences and utilize a language model (LM) for selecting sentences based on likelihood. The VAE is modeled using RNNs comprising of LSTM units. The LSTM-VAE can be used to automatically generate linguistically novel questions, which, (a) corrects classifier bias when augmented to the training data, (b) uncovers incompleteness in the set of answers and (c) improves the accuracy and generalization abilities of the base LSTM classifier, enabling it to learn from smaller training data. The novel questions sometimes belonged to completely new classes not present in the original training data.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for correcting linguistic training bias in training data, has been explained in details with respect to the FIGS. 1 through 6. While aspects of described methods and systems for correcting linguistic training bias in training data can be implemented in any number of different systems, utility environments, and/or configurations, the embodiments are described in the context of the following exemplary system(s).

Figure 1:
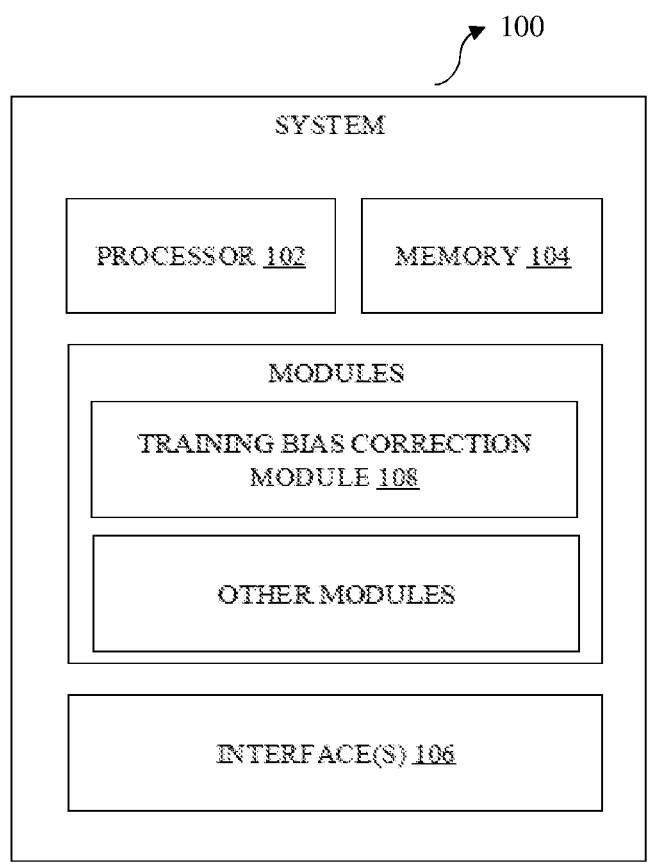
FIG. 1 illustrates a block diagram of a system for correcting linguistic training bias in training data, in accordance with an example embodiment.

FIG. 1 illustrates a block diagram of a system 100 for correcting linguistic training bias in training data, in accordance with an example embodiment. In an example embodiment, the system 100 may be embodied in, or is in direct communication with a computing device. The system 100 includes or is otherwise in communication with one or more hardware processors such as processor(s) 102, one or more memories such as a memory 104, and a network interface unit such as a network interface unit 106. In an embodiment, the processor 102, memory 104, and the network interface unit 106 may be coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor 102 may include circuitry implementing, among others, audio and logic functions associated with the communication. For example, the processor 102 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 102 thus may also include the functionality to encode messages and/or data or information. The processor 102 may include, among other things, a clock, an arithmetic logic unit (ALU) and logic gates configured to support operation of the processor 102. Further, the processor 102 may include functionality to execute one or more software programs, which may be stored in the memory 104 or otherwise accessible to the processor 102.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 104, may store any number of pieces of information, and data, used by the system to implement the functions of the system. The memory 104 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system to behave in a manner as described in various embodiments. The memory 104 includes a training bias correction module 108 and other modules. The module 108 and other modules include routines, programs, objects, components, data structures, etc., which perform particular tasks or implement particular abstract data types. The other modules may include programs or coded instructions that supplement applications and functions of the system 100.

In operation, the system 100 receives a query from a user. For example, the system 100 includes a frequently asked question-bot that receives a query from the user. In an example, a dataset of frequently asked questions for building the bot includes sets of semantically similar questions $Q_i=\{q_1, \ldots, q_{n_i}\}$ and their corresponding answer $a_i$. A set of such questions $Q_i$ and corresponding answer $a_i$ are collectively referred to as a query set $s_i=\{Q_i, a_i\}$. Questions of the query set $s_i$ are represented as $Q_i=Q(s_i)$. It is assumed that the dataset D comprises of many such query sets, i.e., $D=\{s_1 \ldots s_m\}$. In the chatbot implementation, given a user's query q, the objective is to select the corresponding query set s via a multi-class classification model, such that corresponding answer a is shown.

Further, the training bias correction module 108 generates a set of queries associated with the received query using a long short-term memory variational autoencoder (LSTM-VAE) at an inference time. Given all the questions in the training data D, $Q=\cup Q(s_i), \forall s_i \in D$ the training bias correction module 108 generates new questions Q' using LSTM-VAE. Some of the questions in Q' are semantically similar to one of the query sets of D, while the remaining questions do not belong to any of the existing query sets.

Figure 2:
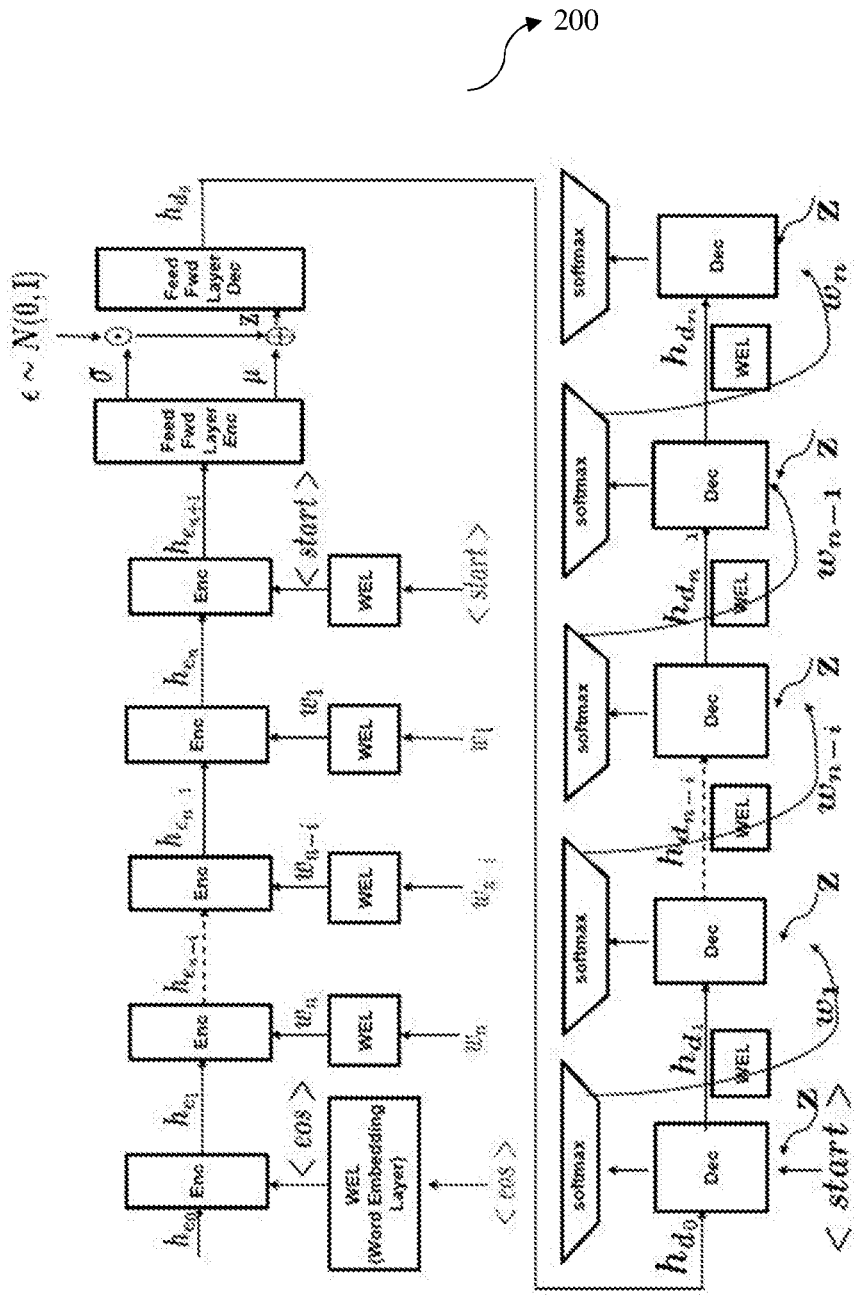
FIG. 2 illustrates a long short-term memory (LSTM)-variational autoencoder (VAE) architecture, in accordance with an example embodiment.
Figure 3:
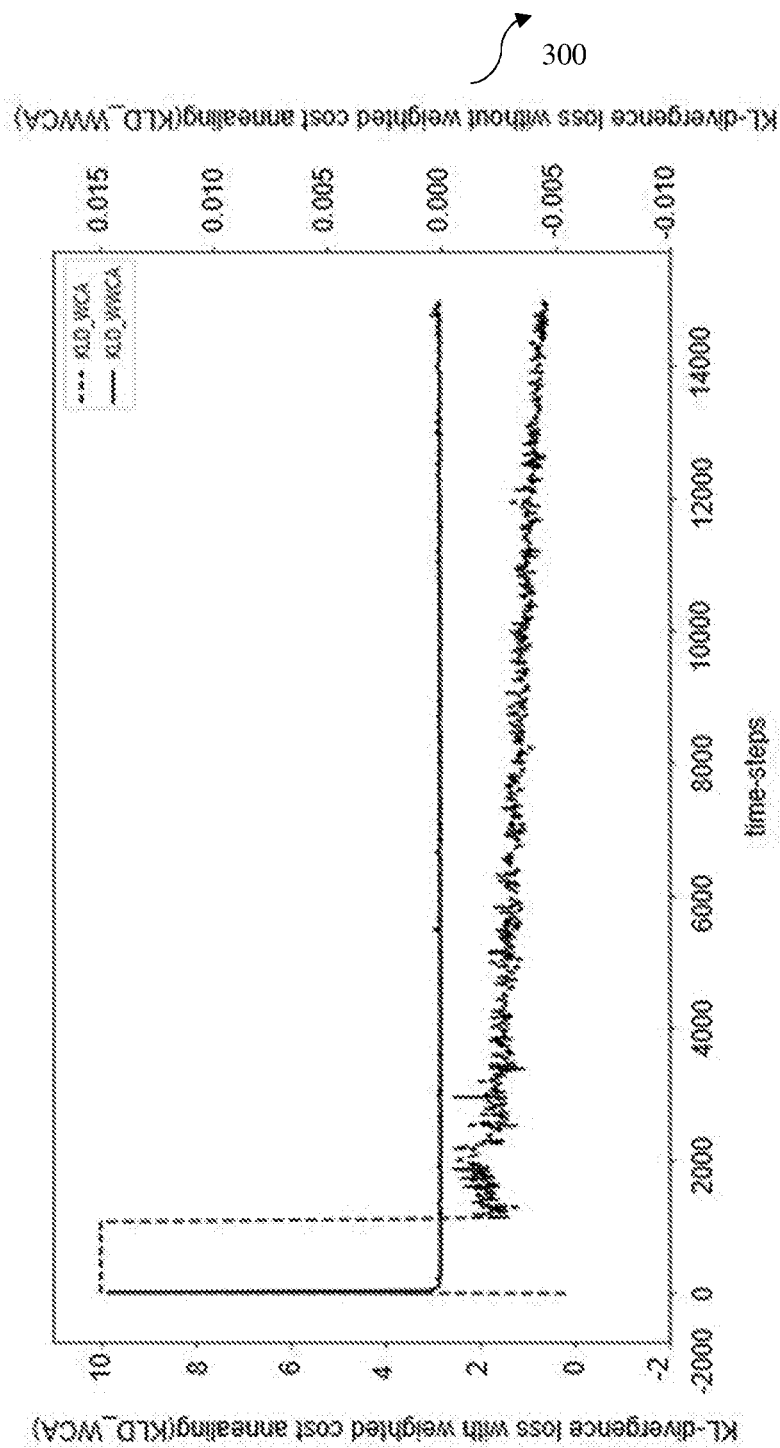
FIG. 3 illustrates a graph representing KL divergence loss over training steps, in accordance with an example embodiment.
Figure 4:
FIG. 4 illustrates a table including new queries generated by the LSTM VAE, in accordance with an example embodiment.

For example, the VAE is a generative model which unlike sequence autoencoders, is comprised of a probabilistic encoder ($q_\phi(z|x)$, recognition model) and a decoder ($p_\theta(x|z)$, generative model). The posterior distribution $p_\theta(z|x)$ is known to be computationally intractable. In this example, a single layer recurrent neural network (RNN) with LSTM units are used as the encoder and decoder of the VAE. Initially, a variable length input query is passed in the encoder in reverse order as shown in an architecture 200 of FIG. 2. Words of a query are first converted into a vector representation after passing through the word embedding layer, before being fed to the LSTM layer. The final hidden state of the LSTM, $h_{e_{n+1}}$ then passes through a feed forward layer, which predicts $\mu$ and $\sigma$ of the posterior distribution $q_\phi(z|x)$. After sampling and via a re-parameterization trick, the sampled encoding z passes through a feed-forward layer to obtain $h_{d_0}$, which is the start state of the decoder RNN. Further, the encoding z is passed as input to the LSTM layer at every time-step. The vector representation of the word with the highest probability, predicted at time t, is also passed as input at next time-step (t+1), as shown in FIG. 2. This helps the LSTM-VAE in generating more queries as compared to those generated by inputting the actual word to the decoder.

In an example implementation, the LSTM-VAE is trained using a weight-cost annealing technique. For example, the weight-cost annealing technique increases a weight of Kullback-Leibler (KL) divergence loss linearly after a predefined epochs and simultaneously reduces a weight of reconstruction loss. In this example, the weight of KL-divergence loss is increased linearly after every e epochs and simultaneously reduce the weight of the reconstruction loss. Due to this, even though the KL-divergence loss increases initially for few time-steps, it starts decreasing over the time-steps but remains non zero. This is shown in a graph 300 of FIG. 3.

In this example implementation, a weighted loss function as mentioned below in equation 1 is utilized and started training the model with $\lambda=0$, keeping it fixed for the first e epochs, i.e., $\lambda(0-e)=0$. Further, $\lambda$ is increased by r after every e epochs, i.e., $\lambda(e-2e)=\lambda(0-e)+r$. Here, e and r are assumed to be hyper parameters. For example, tuning ranges of e is [5, 10, 15] and r is [0.1, 0.05, and 0.025].

$$\mathcal{L}_{(\phi,\theta,x)}=\lambda \cdot KL(q_\phi(z|x)\|p_\theta(z))-(1-\lambda)\cdot \mathbb{E}_{q_\phi(z|x)}(\log p_\theta(x|z)) \quad (1)$$

In this example implementation, z is passed at every step of the LSTM-decoder with the highest probability word taken from the predicted distribution, i.e., greedy decoding $w_t=\text{argmax}_w p(w_0, \ldots, _{t-1}, h_{d_{t-1}}, z)$. To make the decoder rely more on the z during sentence decoding, a word dropout is used by passing a <UNK> token to next step instead of the word predicted by the decoder using greedy decoding. During decoding of a sentence using z, k, the fraction of words are replaced randomly by <UNK> tokens, where k ∈ [0,1] is also taken as a hyper-parameter.

To generate sentences similar to input sentences, $\in$ is sampled and z is obtained using the equation 2, which is a continuous function and therefore differentiable. For example, dimensions of z is [20, 30, 50]. These sampled encodings are decoded by the generative model using greedy decoding to obtain the sentences.

$$z=\mu+\epsilon\cdot\sigma, \text{ where } \epsilon \sim N(0,1) \quad (2)$$

Furthermore, the training bias correction module 108 discards one or more queries comprising consecutively repeating words from the set of generated queries to create a subset of the generated queries. In addition, the training bias correction module 108 selects one or more queries from the subset of the generated queries based on likelihood via a language model trained on a first set of training data. The one or more selected queries are consistent with predefined data. For example, the predefined data includes queries generated by experts in the particular domain. In an example implementation, the training bias correction module 108 learns conditional probability distribution over vocabulary words in the subset of the generated queries based on likelihood via the language model. Further, the training bias correction module 108 selects the queries from the subset of the generated queries based on the learnt conditional probability distribution over the vocabulary words.

In an example, a RNN language model (RNNLM) is a generative model which learns the conditional probability distribution over the vocabulary words. It predicts the next word ($w_{i+1}$) given the representation of words seen so far $h_i$ and current input $w_i$ by maximizing the log likelihood of the next word $p(w_{i+1}|h_i, w_i)$=Softmax $(W_s h_i + b_s)$, averaged over sequence length N. Generally performance of the RNNLM is measured using perplexity (lower is better), Perplexity=$\exp^{\mathcal{L}_{CE\_LM}}$. The cross-entropy loss is used to train the language model.

$$\mathcal{L}_{CE\_LM} = -\frac{1}{N}\sum_{i=1}^{N} \log((p(w_{i+1} | h_i, w_i))$$

Moreover, the training bias correction module 108 classifies the selected as queries that exists in the first set of training data using a first classifier model (i.e., a deep learning classifier) or as new queries based on manual labeling. For example, the first classifier model (M1) is a single layer recurrent neural network with LSTM units for classification trained on the first set of training data. This is used as a baseline for classification. Generally, classification can be considered as a two-step process with the first step requiring a representation of the data. The second step involves using this representation for classification. Data can be represented using a bag of words approach, which ignores the word order information or using hand-crafted features, which fail to generalize to multiple datasets/tasks. We learn the task-specific sentence representation using RNNs with LSTM units by representing the variable length sentence in a fixed length vector representation h, obtained after passing the sentence through the RNN layer. Softmax is then applied over the affine transformation of h, i.e., $p(c|h)$=Softmax $(W_s h + b_s)$. To learn the weights of the above model, the categorical cross entropy loss is minimized, i.e., $$\mathcal{L}_{CE} = -\Sigma_{i=1}^{m} y \cdot \log(p(c_i|h))$$

where $c_i$ is one of the m class and y is 1 only for the target class and zero otherwise.

In an example implementation, the training bias correction module 108 selects one or more of the new queries (top k) which are correctly classified by the first classifier model based on an entropy of a Softmax distribution function. In this example implementation, to obtain a label for the novel questions generated by the VAE, the training bias correction module 108 uses M1 and chooses the top K sentences, based on the entropy of the softmax distribution, as candidates for augmenting the training data. Also, the training bias correction module 108 enables the user to identify the selected queries which are wrongly classified by the first classifier model. In an embodiment, the training bias correction module 108 enables the user to verify the label and correct the label if it is incorrectly classified by M1. Also, the training bias correction module 108 removes the questions that clearly correspond to new classes.

Further, the training bias correction module 108 augments the first set of training data with top k new queries correctly classified by the first classifier model (M1) and the queries which are wrongly classified by the first classifier model to obtain a second set of training data. Furthermore, the training bias correction module 108 trains a second classifier model using the second set of training data, thus correcting linguistic training bias in training data. The queries generated by LSTM-VAE includes newer classes of questions for the FAQ-chatbot, not present in the first training data, which are reviewed and accepted by the domain experts for deployment.

Figure 5:
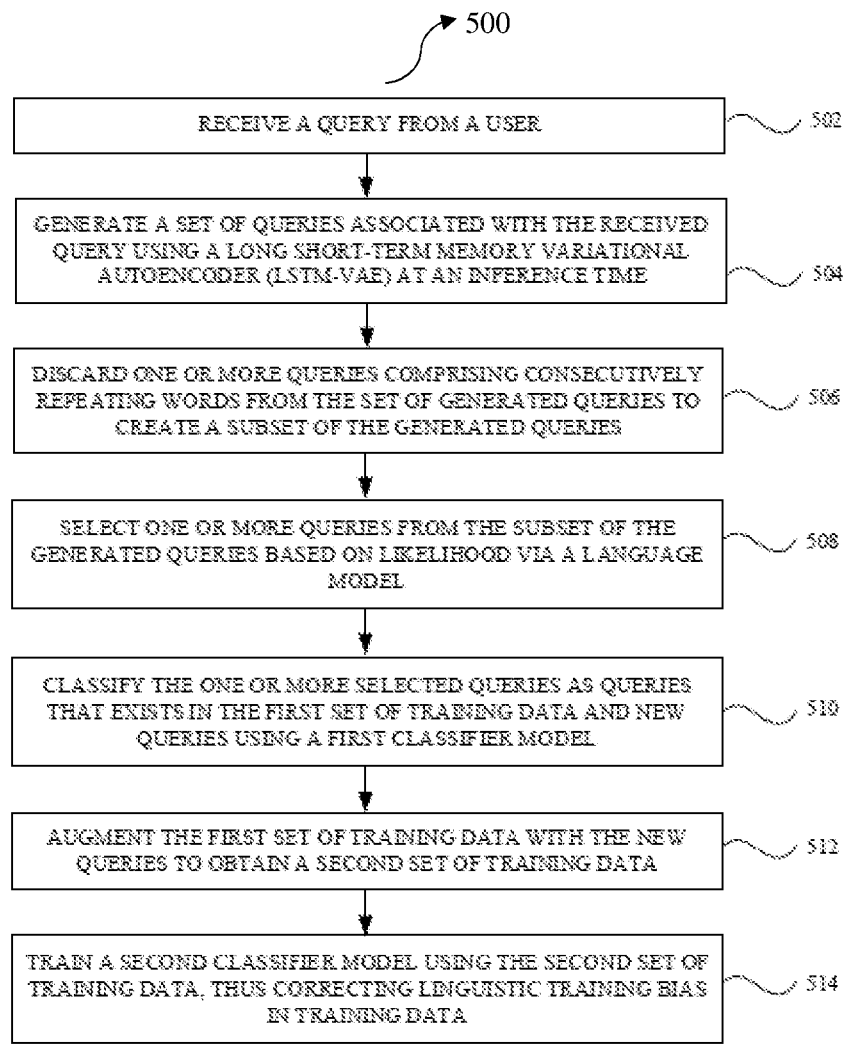
FIG. 5 illustrates a flow diagram of a method for correcting linguistic training bias in training data, in accordance with an example embodiment.

FIG. 5 illustrates a flow diagram of a method for correcting linguistic training bias in training data, in accordance with an example embodiment. The processor-implemented method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, the system 100 of FIG. 1.

At block 502, a query is received from a user. At block 504, a set of queries associated with the received query are generated using a long short-term memory variational autoencoder (LSTM-VAE) at an inference time, the LSTM-VAE is trained using a weight-cost annealing technique. For example, the weight-cost annealing technique increases a weight of Kullback-Leibler (KL) divergence loss linearly after a predefined epochs and simultaneously reduces a weight of reconstruction loss. At block 506, one or more queries including consecutively repeating words are discarded from the set of generated queries to create a subset of the generated queries. At block 508, queries are selected from the subset of the generated queries based on likelihood via a language model trained on a first set of training data, wherein the one or more selected queries are consistent with predefined data. For example, the predefined data includes queries generated by experts in the particular domain. In an example embodiment, conditional probability distribution is learnt over vocabulary words in the subset of the generated queries based on likelihood via the language model. Further, the queries are selected from the subset of the generated queries based on the learnt conditional probability distribution over the vocabulary words.

At block 510, the selected queries are classified as queries that exists in the first set of training data or as new queries using a first classifier model. In an example, the first classifier model is a single layer recurrent neural network with LSTM units for classification trained on the first set of training data. At block 512, the first set of training data is augmented with the new queries to obtain a second set of training data. In an example embodiment, one or more of the new queries which are correctly classified by the first classifier model are selected based on an entropy of a softmax distribution function. Further, the first set of training data is augmented with the one or more of the new queries which are correctly classified by the first classifier model. In some embodiments, the user is enabled to identify the selected queries which are wrongly classified by the first classifier model. Further, the second set of training data is augmented with the queries which are wrongly classified by the first classifier model. At block 516, a second classifier model is trained using the second set of training data, thus correcting linguistic training bias in training data.

Figure 6:
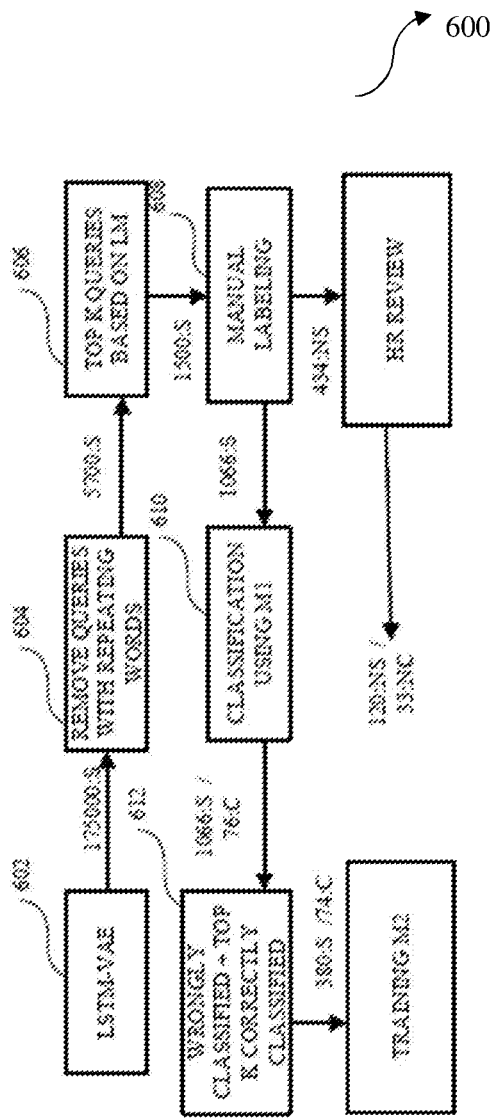
FIG. 6 illustrates a query generation process flow steps, in accordance with an example embodiment.

FIG. 6 illustrates a query generation process flow steps 600, in accordance with an example embodiment. FIG. 6 illustrates the entire workflow followed to generate the novel queries. As shown in FIG. 6, out of the 1, 75,000 queries generated using LSTM-VAE at block 602, the queries already present in the training data, as well as those which have same word repeating more than once consecutively are removed at block 604. After this process, about 5,700 queries are obtained. These queries are then tested using a LM, and only top 1500 sentences are selected based on the likelihood at block 606. Many of these sentences are found to be grammatically correct, while only some of them were semantically inconsistent. At block 608, 1066 queries are selected based on manual labelling. In this process, 434 sentences did not belong to any of the existing classes. These sentences are given to experts for review, and they select 120 sentences belonging to 33 new classes. At block 610, a classifier (M1) classifies the 1066 queries as queries that are already existing in the original query set and new queries. At block 612, top k correctly classified queries and wrongly classified queries are identified and augmented to the original training data to obtain new training data. Further, a new classifier is trained using the new training data, thus correcting the linguistic training bias in the training data.

The various embodiments described in FIGS. 1-6 propose an approach for a generative model, which uses LSTM-VAE followed by sentence selection using a LM for correcting linguistic training bias in training data. In this approach, weighted cost annealing technique is used for training the LSTM-VAE. When such sentences are added to the training set, it indirectly forces the model to learn to distinguish the classes based on some other words than such non-concept words. Thus, augmenting training data with automatically generated sentences is able to correct over-fitting due to linguistic training bias. The newly generated sentences sometimes belonged to completely new classes not present in the original training data. Further, augmenting training data with automatically generated sentences results in an improved accuracy (2%) of the deep-learning classifier.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such non-transitory computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor-implemented method (500) comprising:
receiving, by one or more processors, a query from a user (502);
generating a set, by the one or more processors, of queries associated with the received query using a long short-term memory variational autoencoder (LSTM-VAE) at an inference time, wherein the LSTM-VAE is trained using a weight-cost annealing technique (504);
discarding, by the one or more processors, one or more queries comprising consecutively repeating words from the set of generated queries to create a subset of the generated queries (506);
selecting, by the one or more processors, one or more queries from the subset of the generated queries based on likelihood via a language model trained on a first set of training data, wherein the one or more selected queries are consistent with predefined data (508);

classifying, by the one or more processors, the one or more selected queries as queries that exists in the first set of training data and new queries using a first classifier model (510);

augmenting, by the one or more processors, the first set of training data with the new queries to obtain a second set of training data (512); and training, by the one or more processors, a second classifier model using the second set of training data, thus correcting linguistic training bias in training data (514).

2. The method as claimed in claim 1, wherein the weight-cost annealing technique increases a weight of Kullback-Leibler (KL) divergence loss linearly after predefined epochs.

3. The method as claimed in claim 1, wherein selecting one or more queries from the subset of the generated queries based on likelihood via the language model trained on the first set of training data, comprises:

learning conditional probability distribution over vocabulary words in the subset of the generated queries based on likelihood via the language model; and selecting the one or more queries from the subset of the generated queries based on the learnt conditional probability distribution over the vocabulary words.

4. The method as claimed in claim 1, wherein the first classifier model is a single layer recurrent neural network with LSTM units trained on the first set of training data for classification.

5. The method as claimed in claim 1, wherein augmenting the first set of training data with the new queries, comprises:

selecting one or more of the new queries which are correctly classified by the first classifier model based on an entropy of a softmax distribution function; and augmenting the first set of training data with the one or more of the new queries which are correctly classified by the first classifier model.

6. The method as claimed in claim 1, further comprising:

enabling the user, by the one or more processors, to identify the one or more queries which are wrongly classified by the first classifier model.

7. The method as claimed in claim 6, wherein augmenting the first set of training data, comprises:

augmenting the first set of training data with the new queries and the queries which are wrongly classified by the first classifier model to obtain the second set of training data.

8. A system (100) comprising:

one or more memories (104); and one or more hardware processors (102), the one or more memories coupled to the one or more hardware processors, wherein the one or more hardware processors are capable of executing programmed instructions stored in the one or more memories to:

receive a query from a user;

generate a set of queries associated with the received query using a long short-term memory variational autoencoder (LSTM-VAE) at an inference time, wherein the LSTM-VAE is trained using a weight-cost annealing technique;

discard one or more queries comprising consecutively repeating words from the set of generated queries to create a subset of the generated queries;

select one or more queries from the subset of the generated queries based on likelihood via a language model trained on a first set of training data, wherein the one or more selected queries are consistent with predefined data;

classify the one or more selected queries as queries that exists in the first set of training data and new queries using a first classifier model;

augment the first set of training data with the new queries to obtain a second set of training data; and train a second classifier model using the second set of training data, thus correcting linguistic training bias in training data.

9. The system as claimed in claim 8, wherein the weight-cost annealing technique increases a weight of Kullback-Leibler (KL) divergence loss linearly after predefined epochs.

10. The system as claimed in claim 8, wherein the one or more hardware processors are capable of executing programmed instructions to:

learn conditional probability distribution over vocabulary words in the subset of the generated queries based on likelihood via the language model; and select the one or more queries from the subset of the generated queries based on the learnt conditional probability distribution over the vocabulary words.

11. The system as claimed in claim 8, wherein the first classifier model is a single layer recurrent neural network with LSTM units for classification trained on the first set of training data.

12. The system as claimed in claim 8, wherein the one or more hardware processors are capable of executing programmed instructions to:

select one or more of the new queries which are correctly classified by the first classifier model based on an entropy of a softmax distribution function; and augment the first set of training data with the one or more of the new queries which are correctly classified by the first classifier model.

13. The system as claimed in claim 8, wherein the one or more hardware processors are further capable of executing programmed instructions to:

enable the user to identify the one or more queries which are wrongly classified by the first classifier model.

14. The system as claimed in claim 13, wherein the one or more hardware processors are capable of executing programmed instructions to:

augment the first set of training data with the new queries and the queries which are wrongly classified by the first classifier model to obtain the second set of training data.

15. A computer program product comprising a non-transitory computer readable medium having a computer readable program embodied therein, wherein the computer readable program, when executed on a computing device, causes the computing device to:

receive a query from a user;

generate a set of queries associated with the received query using a long short-term memory variational autoencoder (LSTM-VAE) at an inference time, wherein the LSTM-VAE is trained using a weight-cost annealing technique;

discard one or more queries comprising consecutively repeating words from the set of generated queries to create a subset of the generated queries;

select one or more queries from the subset of the generated queries based on likelihood via a language model trained on a first set of training data, wherein the one or more selected queries are consistent with predefined data;

classify the one or more selected queries as queries that exists in the first set of training data and new queries using a first classifier model;
augment the first set of training data with the new queries to obtain a second set of training data; and
train a second classifier model using the second set of training data, thus correcting linguistic training bias in training data.

* * * * *